April 25, 1961   L. J. A. VAN LIESHOUT ET AL   2,981,855
SYNCHRONOUS MOTOR
Filed March 15, 1956
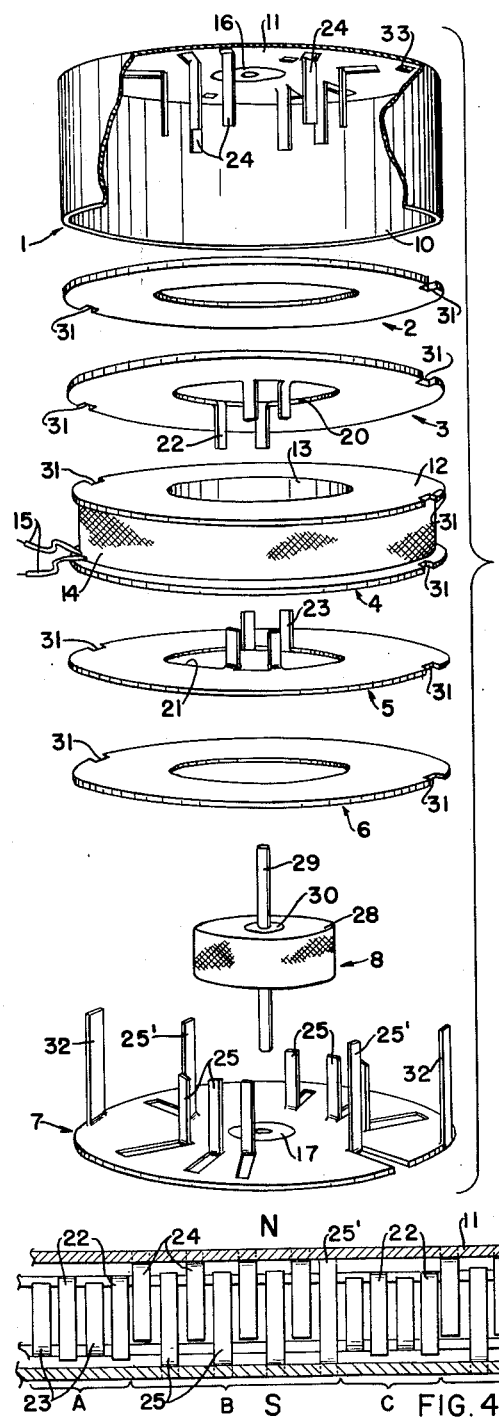
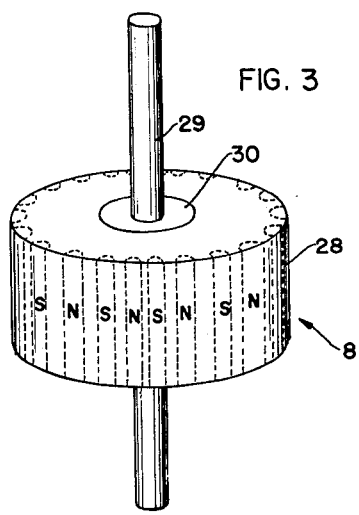
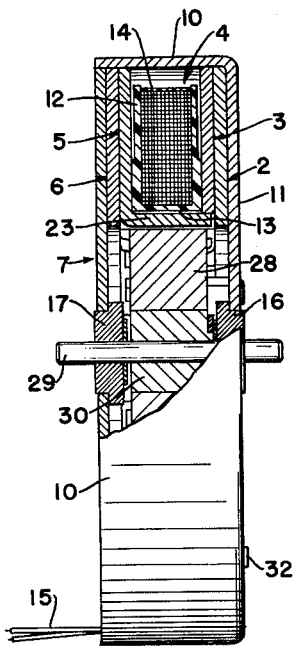
INVENTORS
LOISIUS J. A. VAN LIESHOUT
WILLIAM D. RIGGS
BY
ATTORNEYS

United States Patent Office 2,981,855
Patented Apr. 25, 1961

2,981,855

SYNCHRONOUS MOTOR

Loisius J. A. Van Lieshout, Bethlehem, and William D. Riggs, Woodbury, Conn., assignors to Consolidated Electronics Industries Corp., Waterbury, Conn., a corporation of Delaware Filed Mar. 15, 1956, Ser. No. 571,632

9 Claims. (Cl. 310—163)

This invention relates to unidirectional, self-starting synchronous motors.

The synchronous motor art has failed to develop a small synchronous motor having reliable unidirectional starting characteristics, high starting and running torque and uniform operating characteristics over a wide range of temperature. A motor with these characteristics is particularly desirable for precision timer applications which generally require a relatively low speed motor producing high torque.

We have invented an inductor type synchronous motor having a novel arrangement of stator poles which co-operate with a novel non-salient pole rotor to produce a fully reliable, unidirectional starting characteristic and a starting and running torque characteristic which is several times that obtainable with any prior art motor of comparable size.

The unique arrangement of stator poles requires an entirely new stator structure which is also a part of our invention. The new structure is, to our knowledge, the simplest and least expensive to build that has yet been devised.

According to our invention our motor includes a disc-shaped rotor made of a ferrite material having a high coercivity, a permeability approximately equal to that of air and a low specific gravity, the poles of the rotor being permanently induced in the periphery of the rotor at the time it is manufactured. The stator structure of our motor comprises a pair of laminar pole assemblies. Each of these assemblies is made up of an unshaded pole member of a magnetic metallic material, a non-magnetic metallic shading ring, and a magnetic metallic shaded pole member. A field coil having a central aperture in which the rotor is mounted is located between the pair of pole assemblies with the unshaded pole members thereof adjacent the opposite faces of the coil. A metallic flux path connects the pole members of the two assemblies externally of the field coil. The pole members of each pole assembly are provided with individual poles which extend therefrom into the central aperture of the field coil and which are arranged to lie in substantially the same cylindrical surface coaxial with the axis of the rotor.

While this construction is in itself novel and permits a substantial reduction in the complexity and cost of motors of this type, it also makes possible for the first time an arrangement of the shaded and unshaded poles with respect to each other which results in more nearly optimum distribution of the flux in the magnetic circuits with a consequent improvement in the unidirectional, self-starting characteristic of synchronous motors and which also affords a substantial increase in the starting and running torque obtainable from a motor of a given size and power consumption.

It is known that shading of certain poles of a synchronous motor results in a flux phase shift or time delay of flux rise in the shaded poles of about 45 electrical degrees behind the flux in the unshaded poles. At the same time the flux in the shaded poles is attenuated. The resulting vector summation of the unshaded and shaded fluxes interacting with the poles of the rotor varies substantially so that the rotor torque is, in fact, sometimes negative and sometimes positive with respect to the desired direction of rotation of the rotor. The effect of this is to cause the motor to have completely unpredictable starting characteristics. In fact, in some rotor positions the sum of the torques due to the shaded and unshaded fluxes may be zero or very near zero so that the motor will not start at all. In other angular positions of the rotor with respect to the stator, the rotor may begin to rotate unpredictably backward or forward.

While some techniques have been tried for obtaining continuously positive torque on the rotor with respect to its desired direction of rotation, inherent limitations imposed by the known stator constructions have necessitated compromises which resulted in less than the maximum torque being obtained. Our new construction permits the incorporation of several techniques in combination to provide a low speed synchronous motor which has unusually good unidirectional starting characteristics and which also has appreciably higher torque than has heretofore been obtained with motors of a given size. According to this aspect of our invention, we utilize a novel arrangement of the shaded and unshaded poles to obtain optimum balance between the flux in the shaded and unshaded poles of the stator and to insure that the rotor torque will always have a substantially constant positive value with respect to the desired direction of rotation of the rotor. First, the shaded and unshaded poles of the stator are arranged in separate groups around the inner circumference of the stator, rather than in the conventional alternating shaded and unshaded pole arrangement previously known. Second, our new construction also permits the use of a greater number of shaded poles than unshaded to achieve a net effective shaded pole flux acting on the rotor which is equal, or substantially so, to that of the unshaded poles. This desirable balance is not achieved at the expense of maximum obtainable flux in the unshaded poles as it is in presently known stators. Rather, the total shaded pole flux is brought up to the total of the unshaded pole flux, thereby keeping the efficiency at a high value. Third, the shaded poles of a given polarity are shifted angularly with respect to the unshaded poles of like sign so that the time delay of flux rise in the shaded poles due to shading plus the physical shifting of the poles, both expressed in electrical degrees, results in a torque on the rotor which when combined with the torque due to the flux in the unshaded poles will always result in a resultant torque which is positive with respect to the desired direction of rotation of the rotor. This latter technique is not new per se, having been disclosed in conjunction with another and entirely different stator construction in United States Patent No. 2,437,142 to A. F. Welch et al., issued March 2, 1948.

For a detailed description of a particular embodiment of our invention, attention is directed to the following specification and the accompanying drawing in which Fig. 1 is an exploded view in perspective showing the several parts of a synchronous motor and illustrating the relative positions of the parts;

Fig. 2 is a side elevation partly in section of the motor of Fig. 1 after assembly;

Fig. 3 is a perspective view of the rotor used in the motor of Fig. 1; and

Fig. 4 is a developed section of the stator showing the relation of the shaded and unshaded poles of opposite polarity.

In the following description of a particular embodiment of our invention, it should be borne in mind that the motor was designed specifically for 110 volt, 50–60 cycle alternating current and to operate at 300 r.p.m. on 60 cycle current with an intended power consumption of approximately 2 to 3 watts. Therefore, certain of the limitations which may appear in connection with this particular embodiment are not necessarily limitations on the invention of which this embodiment is only illustrative.

Referring now to Figs. 1 and 2, the motor comprises as principal components a cup-shaped motor housing 1 of a magnetic metallic material, a first washer-shaped nonmagnetic metallic shading ring or coil 2, a first magnetic metallic washer-shaped pole member 3, an alternating current field coil 4, a second washer-shaped magnetic metallic field member 5, a second washer-shaped magnetic metallic shading ring or coil 6 and a disc-shaped magnetic metallic housing closure 7 which also serves as a second shaded pole member. The motor also comprises a rotor 8, the structure and features of which will be described at a later point in the description.

The alternating current field coil 4 is made up of a form 12 of molded plastic having a central aperture 13. The coil is bobbin-wound on the form, the annular winding 14 having a rectangular cross section and comprising, in this particular embodiment, about 5000 turns of insulated No. 42 copper wire. The energizing leads for connecting the coil to a suitable source of alternating current are indicated at 15.

The central aperture 13 of the coil form has a diameter which is somewhat greater than the diameter of the rotor 8 and it is within this central aperture that the rotor 8 runs when the motor is assembled as shown in Fig. 2. Rotor shaft bearings 16 and 17 of any suitable type are pressed into central apertures in the flat end wall 11 of the housing 1 and in the housing closure 7.

The cup-shaped housing 1 is preferably drawn from cold rolled steel and after all the other machining operations are performed is annealed to restore the optimum magnetic properties of the material. This housing comprises a side wall 10 and a plane end wall 11 which also serves as a first shaded pole member. The end of the housing opposite the end wall is open.

For the purposes of the following description of the magnetic circuit structure of the stator, those elements shown to the right of the coil 4 in Fig. 2 and including the end member 11, shading ring 2 and the pole member 3 will be denominated the north elements while those elements to the left of the coil including the pole member 7, the shading ring 6 and the pole member 5 will be denominated the south elements. However, it will be understood that in an alternating current motor, such as this, the elements will not continuously be of one polarity, but will be changing in accordance with the frequency of the energizing current.

The central apertures in the unshaded pole members 3 and 5 have diameters which are substantially the same as the diameter of the central aperture 13 in the coil 4. There are fixed to the inner peripheries 20 and 21 of the members 3 and 5, respectively, elongated poles 22 and 23 which extend normally from the plane of the washer-shaped members. In general, poles 22 and 23 on the members 3 and 5 are so located and of such length that when the members are assembled on the coil the poles 22 and 23 will interlace with each other. Thus, there will be spaced around the surface of the coil aperture 13 alternately a pole 22 and then a pole 23 followed by another pole 22 and another pole 23. While the poles on the members 3 and 5 may be formed separately and then soldered or welded into place, we prefer to form each pole member and its poles, i.e. member 3 and poles 22, as an integral unit by cutting the member by any suitable means from a blank of magnetic metallic material such as cold rolled steel. Utilizing this technique the poles 22, for example, are cut from that portion of the blank which becomes the central aperture of the member 3, but are left attached at one end to the periphery of the aperture. The poles are then bent out of the plane of the washer-shaped member into the substantially perpendicular position shown in Fig. 1.

As previously stated the members 11 and 7 which constitute the north and south shaded pole members, respectively, are also made of a magnetic metallic material such as cold rolled steel. The member 11 is provided with a plurality of poles 24 and the member 7 has an equal number of poles 25. In each case the poles on the shaded pole members are attached to the member at one end and extend normally from the plane thereof. They are spaced about the circumference of a circle which has a diameter substantially the same as the diameter of the aperture 13 in the coil 4. The poles 24 and 25 may be formed in the same manner as the poles 22 and 23 in that they may be cut out of the member itself, leaving one end attached and may then be bent out of the plane of the member. The poles 24 and 25 are also spaced in such manner that in the assembled motor they will interlace with each other. In some pole arrangements to which the stator structure of our invention may be adapted, to cover non-grouped poles the poles 24 and 25 will also be in alternating relation with the poles 22 and 23. By suitably spacing and proportioning the poles, a complete stator pole structure may be formed which comprises cooperating pairs of shaded and unshaded poles, each pair having a north and south pole in accordance with the arbitrary designation set forth above.

To this point we have described the elements which form our new stator structure. This structure can be made to cooperate with many types of rotors, both salient and non-salient pole, presently known in the art. However, we have devised a particular rotor which we believe to be novel and which has exceptionally good magnetic and mechanical characteristics. Our rotor, shown at 8 in Figs. 1 and 2 and in somewhat greater detail in Fig. 3, preferably comprises a cylindrical annulus of a ferrite material which is an isotropic, ceramic, magnetic form of ferrite having a relatively low specific gravity, a permeability approximately equal to that of air, namely, $\mu=1$, and an extremely high coercivity. A commercially obtainable product of this kind is known as "Magnadure" and is manufactured by the Ferroxcube Corporation of America. Magnadure has a specific gravity of 4.5 which results in a relatively low rotor inertia, a desirable feature in inductor type motors. This rotor material is also, most significantly for this application, a magnetically "hard" material; that is, it has a very high value of coercivity which is approximately 1600 oersteds. This permits the placing of poles of opposite polarity adjacent to each other on the periphery of the rotor to form a non-salient pole type rotor. Equally significant from the standpoint of the performance obtained from our new motor is the fact that the permeability of Magnadure is approximately equal to the permeability of air. We have utilized this property of the material, together with other features of our invention, to assist in obtaining optimum flux distribution in the magnetic circuits of our motor under starting and running conditions. Ferrite materials previously tried have had permeabilities much greater than that of air. A direct consequence is that rotors made from such materials introduced flux paths having low reluctance with respect to the reluctance of the stator-rotor air gaps and these acted as undesirable shunts for the flux. The same condition would obtain if the prior art ferrite materials were used in our motor.

The rotor is constructed of an annulus of the ferrite material designated 28 in Fig. 3. The shaft 29 is made of any suitable material and has its central portion knurled or made non-circular. A suitable jig is employed to hold the annulus 28 and the shaft 29 in accurate coaxial alignment with the knurled portion of the shaft within the central aperture of the annulus. While the shaft and the annulus are thus aligned, a thermosetting material 30 of any suitable type is poured into the aperture and allowed to set. By this means a unitary assembly is formed which is at once economical and simple and which is free of static and dynamic unbalance. The knurled or non-circular part of the shaft prevents the annulus from turning on the shaft.

Pairs of diametrically opposed poles of the rotor are induced in the periphery of the ferrite material by any suitable means. In this particular embodiment there are twelve pairs of poles each consisting of two poles of like polarity diametrically oppositely situated on the periphery of the rotor. Adjacent poles are of opposite polarity. For purposes of illustration we have shown in dotted outline the approximate regions of the material which acquire a particular magnetic orientation to form poles and these have been arbitrarily designated N and S to indicate north and south poles. A relatively high unidirectional current flowing in a suitably shaped coil is required for a short period of time to induce the poles in this material, but its high coercivity insures that the magnetic fields to which the rotor is subjected during normal operation of the motor will not disturb the locations of the induced poles nor their magnetic strengths; and adjacent poles of opposite polarity will not cause mutual deterioration.

The assembly of our new motor may be performed by an operation which is unique in its simplicity. To assist in rapid and accurate assembly we provide precisely aligned orientation slots in the outer periphery of each of the shading rings 2 and 6 and in each of the unshaded pole members 3 and 5, as well as in the outer periphery of the coil form 12. In all cases these slots are designated by the numeral 31. To cooperate with these slots we provide orientation ears 32 fixed to the outer periphery of the south shaded pole member 7 and extending normal to the plane of the member in the same direction as the poles 25. These ears 32 and their cooperating slots 31 are precisely oriented with respect to the poles 22, 23, and 25. In addition, there are in the north shaded pole member two slots 33 into which the orientation ears 32 fit when the components of the motor are brought together in assembled relation. The slots 33 are also precisely oriented with respect to the poles 24 to insure that the north and south shaded and unshaded poles are properly interlaced and spaced with respect to each other in the assembled motor.

The assembly of our new motor may be viewed as the formation of two laminar pole assemblies each comprising an unshaded pole member, a shading coil or ring and a shaded pole member. Referring to the drawings, the north pole assembly comprises the shaded pole member 11, the shading coil 2 and the unshaded pole member 3, while the south pole assembly comprises the shaded pole member 7, the shading coil 6 and the unshaded pole member 5. These laminar assemblies are placed on opposite sides of the coil 4 with the unshaded pole members adjacent the opposite faces respectively of the coil. In practice, the assembly of the several elements of the motor is extremely simple. The elements are placed one upon the other in the same relative position shown in Fig. 1 with the orientation slots 31 in register with the orientation ears 32 on the south shaded pole member 7. No special jig or assembly tool of any kind is required to insure that the several elements are properly spaced or aligned. Having brought together the shading rings, the two unshaded pole members and the coil on the south shaded pole member 7, the rotor is then inserted in the central aperture of the laminar assembly with one end of the shaft 29 journaled in the bearing 17. This subassembly is then inserted into the cup-shaped housing 1 with the orientation ears 32 extending through the north shaded pole member which is the end wall 11 of the housing and the other end of the rotor shaft 29 is journaled in the bearing 16. The permanent assembly of the motor is then effected by bending over the portions of the orientation ears 32 which protrude through the slots 33. Inasmuch as the outer diameters of the pole members 3, 5, and 7 are made equal to the inside diameter of the side wall 10 of the housing 1, good flux paths between the two pole assemblies are established externally of the coil 4 through the wall 10 of the housing.

As is shown in Fig. 2, the motor so produced comprises a laminated stator structure having a plurality of shaded and unshaded poles extending into the central aperture of the coil in cooperative relation and lying closely adjacent to the surface of the central aperture 13 of the coil and parallel to the axis thereof. The rotor 8 is located within the congregation of shaded and unshaded poles and is free to turn about its axis. It will be noted that in this construction both the shaded and unshaded poles lie substantially parallel to the peripheral surface of the rotor and present their broader surfaces thereto.

At this point we wish to point out a further simplification of our stator structure which may be employed. Rather than winding the coil on a permanent form such as the form 12, it may be bobbin-wound on a temporary production form of approximately the same shape and then rigidized by saturating it in any suitable coil varnish or "potting" compound. The coil is then baked and removed from the form. It may then be assembled into the motor by placing the unshaded pole members directly against the coil. If additional insulation of the coil from the metallic pole members is deemed necessary, any one of several types of commercially available sheet resin insulating materials may be used.

The stator and motor constructions described in the foregoing are believed to be substantial contributions to the art of synchronous motors in and of themselves. Many known combinations and arrangements of shaded and unshaded poles may be incorporated in a structure of this type and we do not propose to be limited to any particular arrangement and combination. However, we have found that our new stator structure permits the use of a novel arrangement of shaded and unshaded stator poles which is also a part of our invention. In its essentials this consists in the use of a greater number of shaded poles than unshaded poles coupled with the segregation of shaded and unshaded poles into separate groups around the stator. The shaded poles of the stator are physically displaced in the direction of desired rotor rotation by an amount which, for optimum results, is closely related to the lagging phase shift of flux in the shaded poles. In essence this displacement should be substantially equivalent to 180 electrical degrees on the stator less the phase shift due to shading also expressed in electrical degrees.

The pole arrangement on the stator is clearly indicated in Fig. 4 which is a developed section of the stator as it would appear if viewed from the inside of the stator looking outward radially in all directions about the central axis. Here it is assumed that the periphery of the rotor is above the plane of the figure and is moving from left to right. In this view it can be clearly seen that both the shaded and unshaded poles present their broad flat surfaces to the poles of the rotor. This makes the magnetic characteristics of the shaded and unshaded circuits more nearly identical than is possible in motors of other constructions utilizing grouped poles and permits a better balancing of the effective shaded and unshaded fluxes acting upon the rotor. In this view the shaded pole members appear in section at 7 and 11, the shading rings appear at 2 and 6 and the unshaded pole members appear at 3 and 5.

The unshaded poles 22 and 23 extending from the members 3 and 5, respectively, are alternately interlaced with each other and are arranged in two groups encompassed by the brackets A and C. In this motor each group A and C comprises four uniformly spaced north and south unshaded poles. Similarly, there are eight shaded poles 24 and 25 extending from each of the members 11 and 7 which are alternately interlaced and are arranged in two groups encompassed by the brackets B and D, respectively. As shown the shaded pole groups B and D lie in the spaces between the groups of unshaded poles A and C.

The mode of construction of prior stators have required that the unshaded poles be arranged or distorted to attenuate the unshaded flux which the stator is capable of producing to achieve a balance between the effective shaded and unshaded fluxes. On the other hand, our pole arrangement includes more shaded than unshaded poles to obtain more nearly equal effective fluxes acting on the rotor. Moreover, we exercise additional control over the balance of the shaded and unshaded fluxes by making one of the poles, either north or south, in each of the shaded pole groups substantially longer than the others so that it may be utilized as a flux shunt. In Figs. 1 and 4 these shunt poles are shown at 25'. The exact length of these shunting poles will be determined in a motor of particular size by experiment. It may be necessary to extend the poles into physical contact with the opposite shaded pole member, here the north pole member 11, in which case the shunt will have relatively low reluctance. On the other hand, it may be found sufficient to extend the length of the shunt poles only enough to close the air gaps at the ends by some small amount thereby lowering the reluctance of the flux paths through the shunt poles.

As is well known, the maximum practical amount by which the phase of the flux in the shaded poles can be shifted with respect to the phase of the flux in the unshaded poles is about 45 electrical degrees. However, a phase shift of 45 degrees in itself does not insure that the motor will always be self-starting whatever the position of the rotor poles with respect to the stator poles might be, nor will the resultant torque on the rotor always be in the same direction. These two conditions can only be met if all components of the shaded and unshaded fluxes acting on the rotor are properly displaced with respect to each other. We utilize for this, a technique which has been used in specific applications before, but which is new in the present combination; namely, the two groups of shaded poles B and D are shifted along the stator in the direction of the flux shift due to shading, which is also the direction of the desired rotor rotation, by an amount so as to provide maximum attenuation of those components of the total flux which are in a direction opposed to the desired rotation of the rotor. The instantaneous relation of the rotational flux components is such that the maximum value of the resultant unidirectional rotating flux will be obtained when the shaded pole groups are displaced in the direction of desired rotor rotation by an angle, expressed in electrical degrees, which is the supplement of the phase lag angle, also expressed in electrical degrees. For example, if the phase shift of the flux in the shaded poles with respect to the flux in the unshaded poles is 45 electrical degrees, then the shaded pole groups are to be displaced by the equivalent of 135 electrical degrees. It is seen, then, that the displacement of this shaded pole group is a function of the phase lag due to shading that is obtainable in any particular construction of such a motor. It will be understood that substantially 180 degrees results in the optimum combination of these effects but that variations in either or both of the factors within the range of plus or minus 15 or 20 degrees will still give satisfactory results. In Fig. 4 the physical displacement of the poles is shown by the narrow gaps between the end poles of groups A and B and C and D, the poles of each group being otherwise equally spaced by 180 electrical degrees.

The arrangement of stator poles described in the foregoing results in positive unidirectional starting and in distribution of the effective shaded and unshaded flux which provides high starting and running torque in synchronous motors. When used in combination with the novel stator construction and assembly of our invention, it results in a superior motor which allows greatly reduced cost in labor, machining and material. Moreover, a motor constructed in accordance with our invention will be found to operate quite satisfactorily under wide extremes of ambient temperature.

Having described particular embodiments of our invention solely for the purpose of illustration, the scope of the invention is defined by the following claims.

We claim:

1. A stator structure for a synchronous motor comprising a pair of laminar pole assemblies each having a washer-shaped magnetic metallic unshaded pole member, a washer-shaped non-magnetic metallic shading ring, and a magnetic metallic shaded pole member, a field coil mounted between the unshaded pole members of said pair of assemblies and having a central aperture therethrough, and a metallic flux path connecting the pole members of said pair of assemblies externally of said coil, said unshaded pole members each having at least two spaced groups of a number $m$ of poles extending from the inner perimeter thereof into the coil aperture to interlace with the poles of the groups on the unshaded pole member of the other assembly, said shaded pole members each having at least two spaced groups of a number $n$, greater than $m$, of poles extending through the apertures of said ring and unshaded member into said coil aperture to interlace with the poles of the groups on the shaded member of the other assembly, the interlaced groups of shaded poles lying in the spaces between the interlaced groups of unshaded poles and all of said poles lying substantially in a cylindrical surface within said coil aperture.

2. A stator structure for a synchronous motor comprising a magnetic metallic cylindrical housing having an integral end wall and a laminar assembly within said housing which comprises, in the order named from said end wall, a first washer-shaped metallic shading ring, a first washer-shaped metallic unshaded pole member, a field coil having a central aperture therethrough, a second washer-shaped metallic unshaded pole member, a second washer-shaped metallic shading ring, and a metallic shaded pole member, said first and second unshaded pole members each having at least two spaced groups of poles extending into the aperture of said coil and interlaced with the poles of the groups of the other unshaded member, each of said groups of poles on said unshaded pole members having $m$ poles, said end wall and said second shaded member each having at least two spaced groups of poles extending into the aperture of the coil and interlaced with the poles of the groups of the other, each of said groups of poles on said end wall and said second shaded member having $n$, greater than $m$, poles, all of said poles lying in substantially the same cylindrical surface coaxial within said aperture with the interlaced groups of poles of said unshaded members in the spaces between the interlaced groups of poles of said end wall and shaded member, the groups of poles on said end wall and shaded member being displaced in the direction of flux shift due to shading by an amount, expressed in electrical degrees, which is approximately the supplement of the angle of flux shift expressed in electrical degrees, and means for maintaining said members, rings and coil in assembled relation within said housing.

3. A synchronous motor comprising a pair of laminar pole assemblies each having, in the order named, a washer-shaped magnetic metallic unshaded pole member, a washer-shaped non-magnetic metallic shading ring, and a magnetic metallic shaded pole member, a field coil mounted between the unshaded pole members of said pair of assemblies and having a central aperture therethrough, and a metallic flux path connecting the pole members of said pair of assemblies externally of said coil, said unshaded pole members each having at least two spaced groups of a number $m$ of poles extending from the inner perimeter thereof into the coil aperture to interlace with the poles of the groups on the unshaded pole member of the other assembly, said shaded pole members each having at least two spaced groups of a number $n$, greater than $m$, of poles extending through the apertures of said ring and unshaded member into said coil aperture to interlace with the poles of the groups on the shaded member of the other assembly, the interlaced groups of shaded poles lying in the spaces between the interlaced groups of unshaded poles and all of said poles lying substantially in a cylindrical surface within said coil aperture, and a non-salient pole rotor mounted for rotation within the congregation of poles in the coil aperture, which rotor comprises an annular member composed of a magnetic ferrite material having a high coercivity and a permeability approximately equal to that of air, said member having induced in the periphery thereof a plurality of limited regions of the material each uniformly magnetically oriented, and adjacent regions being of opposite magnetic orientation.

4. A synchronous motor comprising a pair of laminar pole assemblies each having, in the order named, a washer-shaped magnetic metallic unshaded pole member, a washer-shaped non-magnetic metallic shading ring, and a magnetic metallic shaded pole member, a field coil mounted between the unshaded pole members of said pair of assemblies and having a central aperture therethrough, and a metallic flux path connecting the pole members of said pair of assemblies externally of said coil, said unshaded pole members each having at least two spaced groups of a number $m$ of poles extending from the inner perimeter thereof into the coil aperture to interlace with the poles of the groups on the unshaded pole member of the other assembly, said shaded pole members each having at least two spaced groups of a number $n$, greater than $m$, of poles extending through the apertures of said ring and unshaded member into said coil aperture to interlace with the poles of the groups on the shaded member of the other assembly, the interlaced groups of shaded poles lying in the spaces between the interlaced groups of unshaded poles and all of said poles lying substantially in a cylindrical surface within said coil aperture, the groups of shaded poles being angularly displaced with respect to the groups of unshaded poles in the direction of flux shift due to shading by an amount, expressed in electrical degrees, which is approximately the supplement of the angle of flux shift expressed in electrical degrees, and a non-salient pole rotor mounted for rotation within the congregation of poles in the coil aperture, said rotor comprising a shaft, an annulus of a magnetic ferrite material having high coercivity and a permeability approximately equal to that of air, said annulus being coaxial with said shaft, the central aperture of said annulus having a diameter substantially greater than the diameter of the shaft, and a plastic material in the space between the shaft and the annulus to fix the shaft and annulus together, said annulus having induced in the periphery thereof a plurality of poles, equal to the number of shaded and unshaded stator poles, of limited regions of the annulus material each being substantially uniformly oriented, and adjacent regions being of opposite magnetic orientation.

5. A synchronous motor comprising a pair of laminar pole assemblies each having, in the order named, a washer-shaped magnetic metallic unshaded pole member, a washer-shaped non-magnetic metallic shading ring, and a magnetic metallic shaded pole member, a field coil mounted between the unshaded pole members of said pair of assemblies and having a central aperture therethrough, and a metallic flux path connecting the pole members of said pair of assemblies externally of said coil, said unshaded pole members each having at least two spaced groups of a number $m$ of poles extending from the inner perimeter thereof into the coil aperture to interlace with the poles of the groups on the unshaded pole member of the other assembly, said shaded pole members each having at least two spaced groups of a number $n$, greater than $m$, of poles extending through the apertures of said ring and unshaded member into said coil aperture to interlace with the poles of the groups on the shaded member of the other assembly, the interlaced groups of shaded poles lying in the spaces between the interlaced groups of unshaded poles and all of said poles lying substantially in a cylindrical surface within said coil aperture, the groups of shaded poles being angularly displaced with respect to the groups of unshaded poles in the direction of flux shift due to shading by an amount, expressed in electrical degrees, which is approximately the supplement of the angle of flux shift expressed in electrical degrees, and a non-salient pole rotor mounted for rotation within the congregation of poles in the coil apertures, said rotor comprising a shaft having a knurled portion, an annulus of an isotropic, ceramic, magnetic material having high coercivity and a permeability approximately equal to that of air, said annulus being coaxial with said shaft and located along said shaft substantially in the vicinity of said knurled portion, the central aperture of said annulus having a diameter substantially greater than the diameter of the knurled portion of the shaft, and a plastic material in the space between the shaft and the annulus to fix the shaft and annulus together, said annulus having induced in the periphery thereof a plurality, equal to the number of shaded and unshaded stator poles, of limited regions of the annulus material each being substantially uniformly oriented, and adjacent regions being of opposite magnetic orientation.

6. A synchronous motor comprising a plurality of angularly spaced poles arranged in a pole circle about a central axis, an alternating current field coil in magnetic flux linking relation with said poles, at least two circumferentially spaced groups of poles being provided with means for delaying the change of flux in the poles to form spaced groups of shaded poles alternating with groups of unshaded poles, each group of shaded poles having a number $n$ of poles of each polarity, each group of unshaded poles having a number $m$, different from $n$, of poles of each polarity the flux linking relation of said field coil with said poles being such that adjacent poles in each of said unshaded and shaded groups are of opposite polarity, a rotor mounted for rotation within said pole circle about the central axis thereof and comprising a plurality of poles arranged about the periphery of the rotor such that adjacent poles are of opposite magnetic polarity.

7. A synchronous motor according to claim 6 and in which the groups of shaded poles are displaced in the direction of flux shift due to shading from positions of equiangular distribution with respect to the groups of unshaded poles by an amount, expressed in electrical degrees, which is approximately the supplement of the flux shift due to shading expressed in electrical degrees.

8. A synchronous motor comprising a stator having a plurality of angularly spaced poles arranged in a pole circle about a central axis, an alternating current field coil in magnetic flux linking relation with said poles, at least two circumferentially spaced groups of poles being provided with means for delaying the change of flux in the poles to form spaced groups of shaded poles alternating with groups of unshaded poles, each group of unshaded poles having a number $m$ of poles of each polarity, each group of shaded poles having a number $n$, greater than $m$, of poles of each polarity, the flux linking relation between said field coil and said poles being such that adjacent poles in each of said shaded and unshaded groups are of opposite magnetic polarity and a rotor mounted for rotation within said pole circle about the central axis thereof, said rotor comprising an annular member composed of a magnetic ferrite material having a high coercivity and a permeability approximately equal to that of air, said member having induced in the periphery thereof a plurality of limited regions of uniform magnetic orientation and adjacent regions being of opposite magnetic orientation.

9. A synchronous motor according to claim 8 and in which the groups of shaded poles are displaced in the direction of flux shift due to shading from positions of equiangular distribution with respect to the groups of unshaded poles by an amount, expressed in electrical degrees, which is approximately the supplement of the flux shift due to shading expressed in electrical degrees.

References Cited in the file of this patent

UNITED STATES PATENTS

| | | |
|---|---|---|
| 2,064,090 | Sullivan | Dec. 15, 1936 |
| 2,101,665 | Arey et al. | Dec. 7, 1937 |
| 2,437,142 | Welch | Mar. 2, 1948 |
| 2,488,729 | Kooyman | Nov. 22, 1949 |
| 2,683,230 | Mickelson | July 6, 1954 |

FOREIGN PATENTS

| | | |
|---|---|---|
| 500,962 | Great Britain | Feb. 17, 1939 |

OTHER REFERENCES

Permanent Magnet Design Manual, pages 32–33, Chemical Department, General Electric, Pittsfield, Mass.